No. 685,064. Patented Oct. 22, 1901.
A. L. SCHUBERT.
PROCESS OF PRODUCING LIME OR CEMENT AND COMBUSTIBLE GASES.
(Application filed Apr. 2, 1901.)
(No Model.) 2 Sheets—Sheet 1.
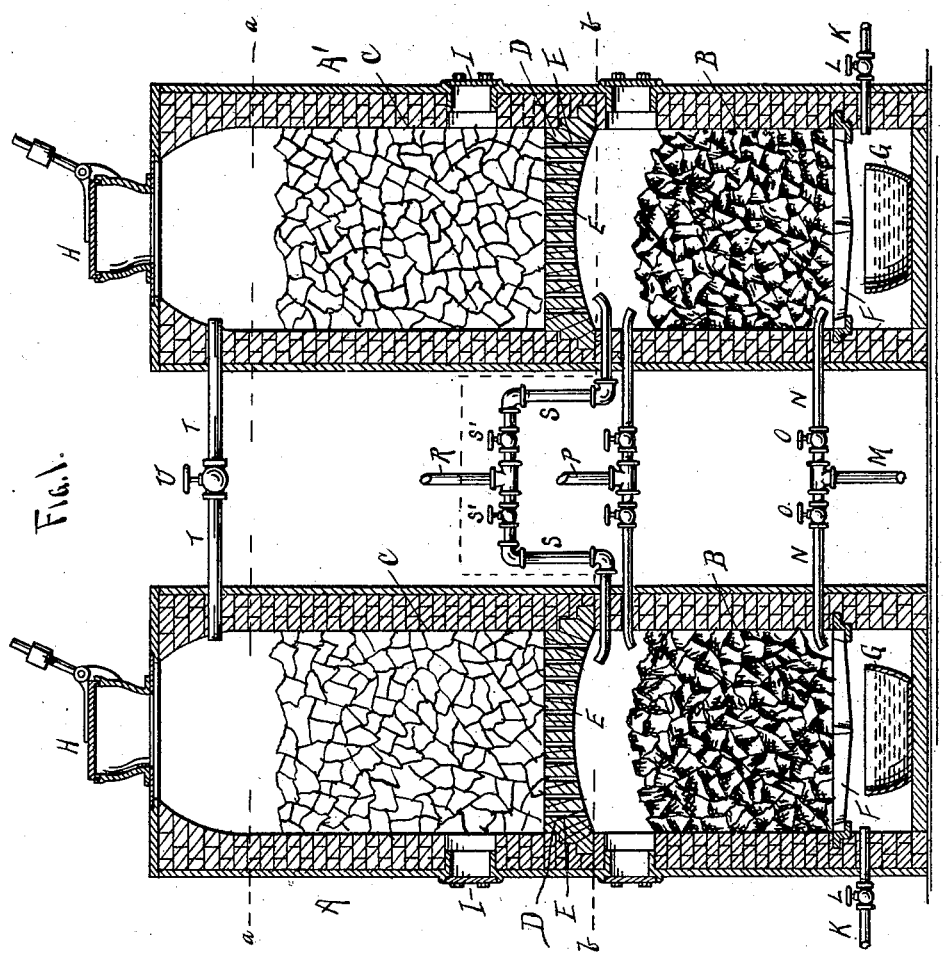
Witnesses
C. N. Woodward
J. W. Garner
A. L. Schubert, Inventor
By C. A. Snow & Co.
Attorneys
THE NORRIS PETERS CO., PHOTO-LITHO., WASHINGTON, D. C.

No. 685,064. Patented Oct. 22, 1901.
A. L. SCHUBERT.
PROCESS OF PRODUCING LIME OR CEMENT AND COMBUSTIBLE GASES.
(Application filed Apr. 2, 1901.)
(No Model.) 2 Sheets—Sheet 2.
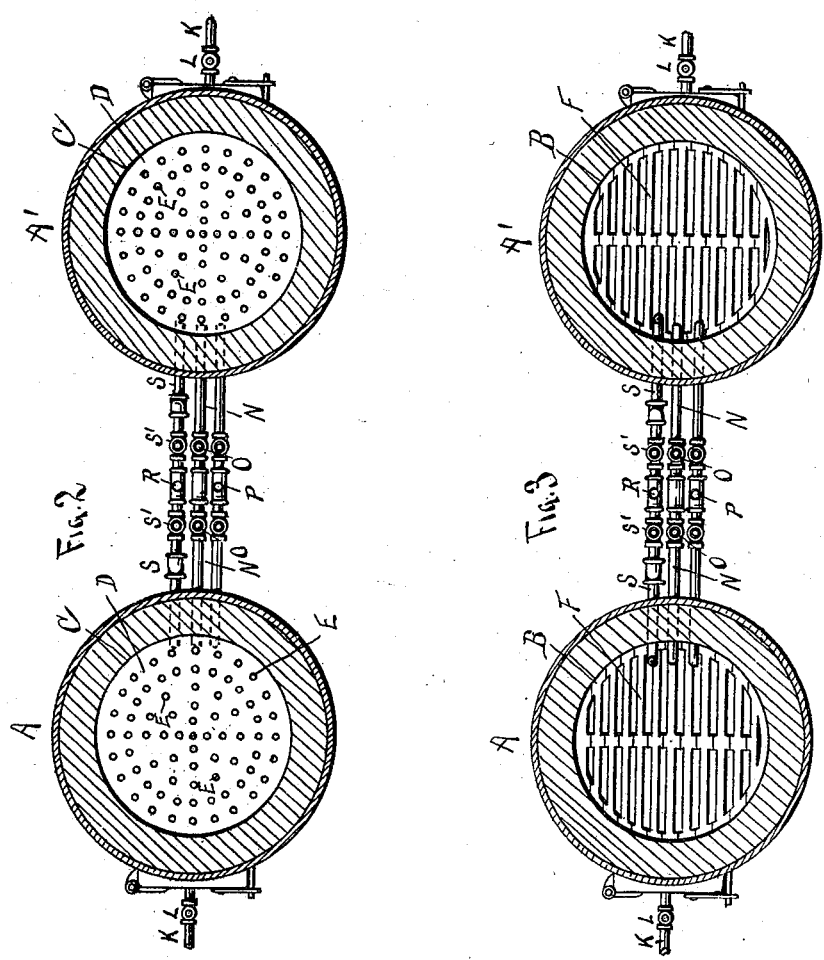

UNITED STATES PATENT OFFICE.

ALVIN LINCOLN SCHUBERT, OF SACRAMENTO, CALIFORNIA.

PROCESS OF PRODUCING LIME OR CEMENT AND COMBUSTIBLE GASES.

SPECIFICATION forming part of Letters Patent No. 685,064, dated October 22, 1901.

Application filed April 2, 1901. Serial No. 54,045. (No specimens.)

*To all whom it may concern:*

Be it known that I, ALVIN LINCOLN SCHUBERT, a citizen of the United States, residing at Sacramento, in the county of Sacramento and State of California, have invented a new and useful Process of Producing Lime or Cement and Combustible Gases Suitable for Heating, Lighting, and Power Purposes, of which the following is a specification.

My invention is an improved process of producing lime or cement and combustible gases suitable for heating, lighting, and power purposes.

The object of my invention is to effect an economy in the materials used and to obtain a larger percentage of combustible gases than heretofore by converting the products of combustion, as well as all crude gaseous matter coming from raw materials, largely into combustible gases.

In the accompanying drawings, Figure 1 is a vertical sectional view of a pair of generators adapted for carrying out my improved process. Fig. 2 is a horizontal sectional view of the same, taken on a plane indicated by the line $a\ a$ of Fig. 1. Fig. 3 is a similar view taken on a plane indicated by the line $b\ b$ of Fig. 1.

The form of apparatus here shown for carrying out my improved process consists, essentially, of a pair of generators A A', each of which has a lower combustion-chamber B and a chamber C above the same adapted to contain a charge of limestone or raw cement. The arch D over the combustion-chamber, and which forms the bottom of the chamber C, is provided with apertures or channels E, whereby said chambers communicate with each other. In each combustion-chamber B is a grate F of suitable form, below which is a vessel G, containing water. Each combustion-chamber B has a suitable door, through which it may be charged with fuel, and each chamber C has on its upper side a suitable stack-valve H, through which it may be charged, and on one side a door I, through which the charge may be withdrawn. An air-blast pipe K discharges into each combustion-chamber at a point below the grate and is provided with a suitable valve L. A gas-pipe M is provided with branches N, which lead from and connect the combustion-chambers at a point slightly above the grates thereof, and each of said branch pipes is provided with a valve O. A suitable valved pipe P is adapted for discharging oil or steam at will into either of the combustion-chambers at a point above the fuel therein. A blast-pipe R is provided with branches S for discharging an air-blast upward in the upper portion of each of the combustion-chambers at will. Each branch pipe S has a valve S'. A pipe T connects the upper portions of the chambers C and is provided with a valve U.

In carrying out my improved process I first fill each of the combustion-chambers B with any kind of solid carbonaceous fuel to the depth of about seven feet, and having ignited the fuel cause the same to burn by discharging blasts of air therethrough from the pipes K, the stack-valves H having been opened to allow the products of combustion to escape. This heats the chambers C intensely and is continued until the fuel is in a state of incandescence. The blasts of air are then cut off by the valves L. Each of the chambers C is then charged through the open stack-valves H with limestone or any other form of calcium carbonate when I desire to make lime or when I desire to make cement with raw cement mixed with carbonaceous fuel. The stack-valves H are then closed and the valve L of one of the generators—say of the generator A—is opened, thereby applying a blast of air to the body of incandescent fuel in the chamber B of said generator A, causing the said fuel to burn and the products of combustion to pass upward therefrom directly through the body of limestone or raw cement and coal in the chamber C above, the said products of combustion percolating through limestone or cement and coal and heating the same and driving out the carbonic-acid gas contained in limestone. If the material in the chamber C be limestone, the same is reduced to lime. If the material in the chamber C be raw cement and coal, the heated products of combustion from the body of burning incandescent fuel below drive out of the raw cement carbonic-acid gas and vapor of water contained therein, and from the coal mixed therewith coal-gas, tar, ammonia, and vapor of water. The products of combustion from the lower body of burning incandescent solid fuel, together with the gaseous matters and vapor of water from the limestone or raw cement and carbonaceous fuel, are caused to pass from the chamber C of generator A to the chamber C of the generator A' and down through the body of limestone or raw cement and coal contained in said chamber C of generator A', thereby causing the gaseous matters and vapor of water in the charge therein to be expelled and mingled with the products of combustion and gaseous matter from the generator A. All gaseous matter and products of combustion are then passed down through the body of highly-heated solid fuel in chamber B of generator A' and are converted into a fixed combustible gas thereby, excepting the nitrogen contained in the air used for combustion. The fixed gases are discharged from the chamber B of generator A' through the valved branch pipe N thereof and the pipe M to the point where they are consumed, or to purifiers if the gases are to be used for illuminating and power purposes. When the temperature of the heated fuel in the chamber B of generator A' becomes too low to fix the gases, the operation of the said generators is reversed. Hence while the body of fuel in one combustion-chamber is in a state of combustion and is being subjected to the action of the air-blast the previously-heated body of fuel in the other combustion-chamber is utilized for fixing the gases resulting from the products of combustion and the gases and vapors expelled from the limestone or raw cement and coal in the chamber C.

If the material treated in the chambers C be limestone, the same after it has been reduced or converted into lime is removed therefrom through the door I. If the material in the chambers C be raw cement and coal, the cement after it has yielded its gases and vapors and after the coal admixed therewith has after yielding its gases and vapors been converted into coke must be clinkered. To effect this, air-blasts are admitted through the pipe R and branch pipes S, thereby causing combustion of the coke mixed with the partially-burned cement, and hence clinkering the cement. The stack-valves H may be left open or kept closed while the cement is being clinkered. If closed, the products of combustion of the coke become fixed into combustible gases and nitrogen precisely as in the process hereinbefore described.

By means of the pipe P steam or oil may be commingled with the gases making the down run. When steam is used thus, it is converted into fixed water-gas. When oil is used, the gases are enriched for illuminating purposes.

Having thus described my invention, I claim—

1. The process of producing lime, cement or the like, and combustible gases, consisting in passing heated products of combustion of burning fuel through raw material, as calcium carbonate, raw cement or the like, thereby expelling gaseous matter therefrom, and subsequently fixing products of combustion and gaseous matter from said material, by passing said products of combustion and said gaseous matter through a body of highly-heated fuel, substantially as described.

2. The process of producing cement and combustible gases consisting in passing heated products of combustion of burning fuel through a mixture of raw cement and carbonaceous fuel, thereby expelling from said mixture all gaseous matter and vapors of water contained therein and subsequently passing products of combustion of burning fuel and all gaseous matter and vapors of water coming from said mixture of raw cement and carbonaceous fuel, through a body of highly-heated fuel, substantially as described.

3. The process of producing cement and combustible gases consisting in passing heated products of combustion of burning fuel through a mixture of raw cement and carbonaceous fuel, thereby expelling therefrom all gaseous matter and vapors of water, clinkering the partially-burned cement by burning the residual combustible matter mixed therewith, and subsequently passing all products of combustion of burning fuel, together with all gaseous matter and vapors of water from said mixture of raw cement and carbonaceous fuel, through a body of highly-heated fuel, substantially as described.

4. The process of producing lime or cement and combustible gases consisting in passing heated products of combustion of burning fuel through raw material as raw cement or calcium carbonate, thereby expelling therefrom all gaseous matter and vapors of water, thereafter mixing with said products of combustion, gaseous matter and vapors of water, steam or oil, or both steam and oil, and subsequently passing all these products through a body of highly-heated fuel, substantially as described.

5. The process of producing cement and combustible gases consisting in passing heated products of combustion of burning fuel through a mixture of raw cement and carbonaceous fuel, thereby expelling all gaseous matter and vapors of water therefrom, clinkering the cement by burning residual combustible matter contained therein, mixing with all gaseous matter and products of combustion so obtained, steam or oil or both steam and oil, and subsequently passing said mixture through a body of highly-heated fuel, substantially as described.

In testimony that I claim the foregoing as my own I have hereto affixed my signature in the presence of two witnesses.

ALVIN LINCOLN SCHUBERT.

Witnesses:
W. F. TRAINOR,
C. F. GORMAN.